July 7, 1964 H. T. HODGES 3,139,809
CARD SHINGLING DEVICE AND CLAMP THEREFOR
Filed Jan. 30, 1961 6 Sheets-Sheet 1
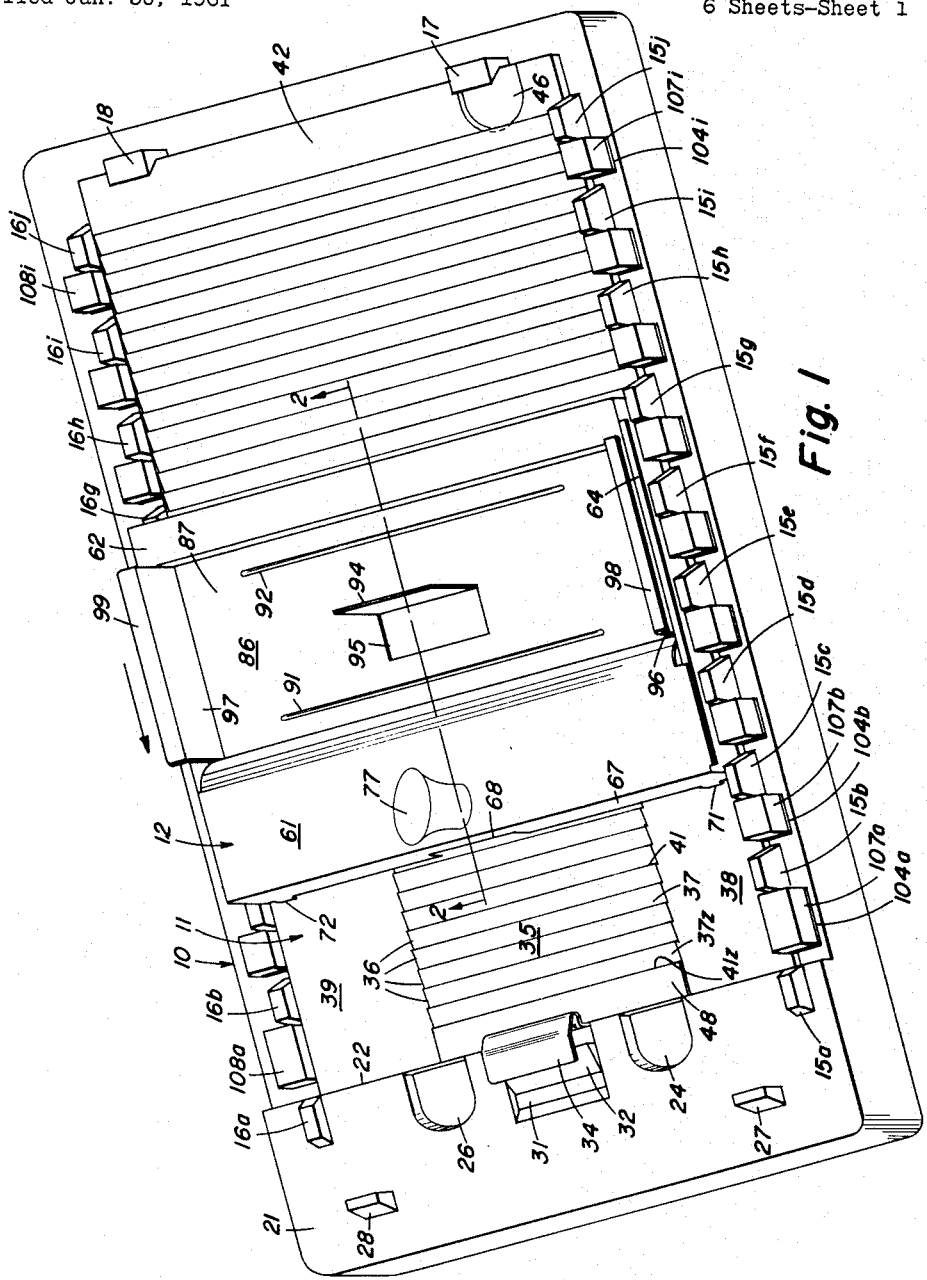
Fig. I
HOWARD T. HODGES
INVENTOR.
BY R. Frank Smith
Paul W. Holmes
ATTORNEYS July 7, 1964  H. T. HODGES  3,139,809
CARD SHINGLING DEVICE AND CLAMP THEREFOR
Filed Jan. 30, 1961  6 Sheets-Sheet 2
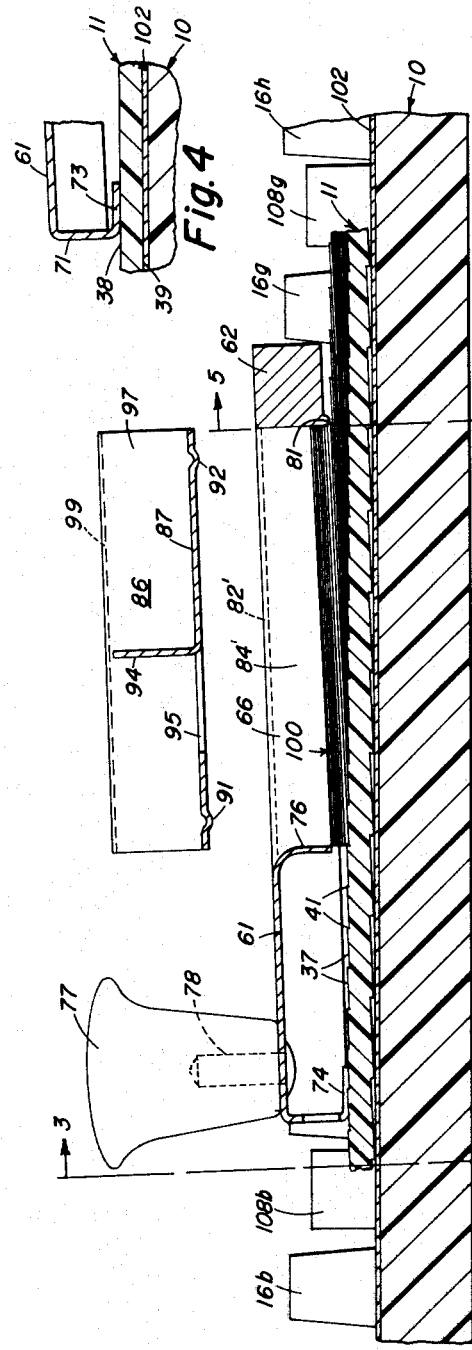
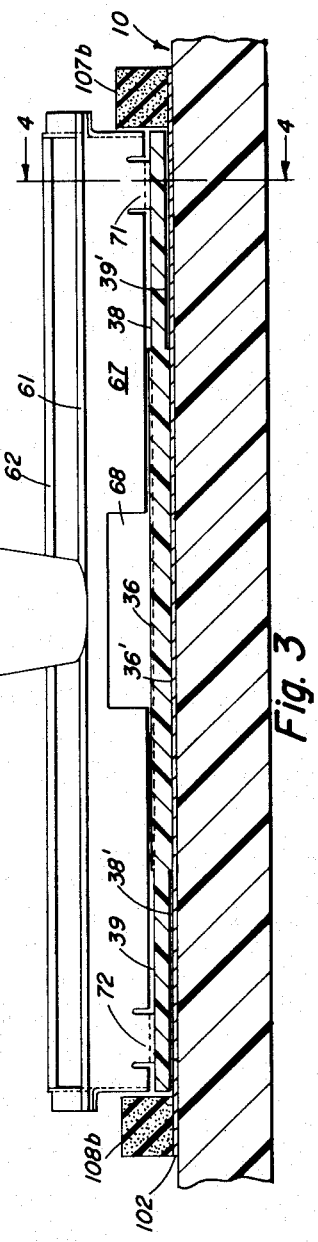
HOWARD T. HODGES
INVENTOR.
BY R. Frank Smith
Paul P. Holmes
ATTORNEYS July 7, 1964  H. T. HODGES  3,139,809
CARD SHINGLING DEVICE AND CLAMP THEREFOR
Filed Jan. 30, 1961  6 Sheets-Sheet 3

HOWARD T. HODGES
INVENTOR.

BY R. Frank Smith
Paul W. Holmes
ATTORNEYS

HOWARD T. HODGES
INVENTOR.

BY
ATTORNEYS

July 7, 1964

H. T. HODGES 3,139,809

CARD SHINGLING DEVICE AND CLAMP THEREFOR

Filed Jan. 30, 1961

HOWARD T. HODGES
INVENTOR.

BY

ATTORNEYS

July 7, 1964 H. T. HODGES 3,139,809
CARD SHINGLING DEVICE AND CLAMP THEREFOR
Filed Jan. 30, 1961 6 Sheets-Sheet 6
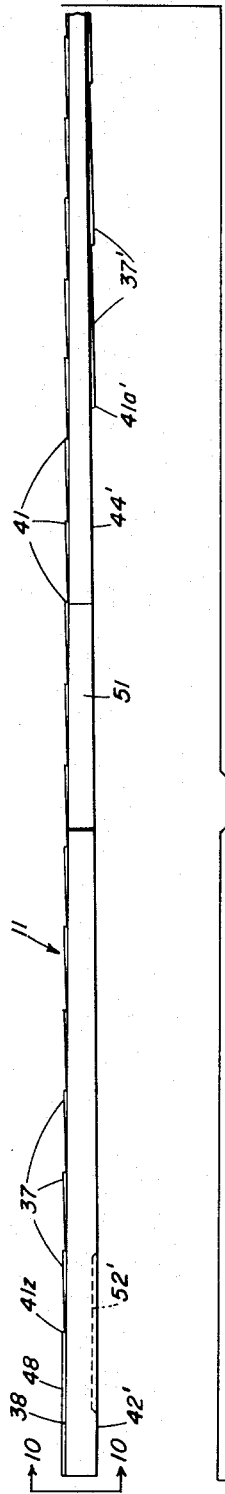
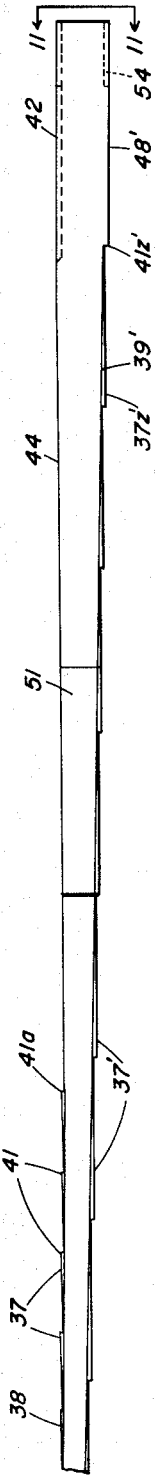
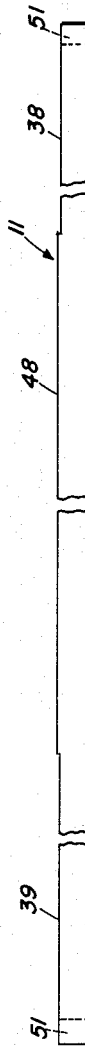
HOWARD T. HODGES
INVENTOR.
BY R. Frank Smith
Paul P. Holmes
ATTORNEYS

United States Patent Office 3,139,809
Patented July 7, 1964

3,139,809
CARD SHINGLING DEVICE AND CLAMP THEREFOR
Howard T. Hodges, Rochester, N.Y., assignor to Eastman Kodak Company, Rochester, N.Y., a corporation of New Jersey
Filed Jan. 30, 1961, Ser. No. 85,799
14 Claims. (Cl. 95—85)

This invention relates to a device for arranging and holding business machine cards in a shingled array, to display information on the exposed portion of each card, and to permit its reproduction.

In some data processing operations in which business machine cards are employed, it is desirable to spread the cards in an overlapped or shingled arrangement, so that printed matter along marginal portions of the cards becomes exposed and can be observed, recorded, or reproduced. A single reproduction from such an array provides a record of information on the exposed portions of all the cards in the array, and, for example, could be used for such purposes as providing a list of employees directly from cards listing the names of individual employees. The reproduction of the printed matter can be made in any convenient way by using standard reproduction techniques such as, for example, photography, thermography, and the like.

Shingling a group of cards can be done by hand, but this is a long, tedious, and often inaccurate and non-uniform operation. Some consideration has been given to the development and use of mechanical shingling devices. A successful mechanical shingling device would eliminate a great deal of labor and would improve accuracy and efficiency.

However, in working with devices of this type, one difficulty that has been observed arises because of the tendency of the cards to shift their relative positions during the reproduction process. For example, merely placing a sensitized sheet over the shingled array may cause undesirable shifting of the cards, and could result in an incomplete reproduction. There is therefore a need for some simple means for holding the cards in an array in place during handling, and particularly during reproduction. The ways in which this need can be met are restricted, however, since the physical shape in which documents can be accepted by most copiers is restricted.

One object of the present invention is to facilitate business card operations where a shingled array of cards is employed, by providing means by which a stack of business machine cards can be rapidly and accurately disposed in a shingled arrangement, and then held in that arrangement during use of the array for reproduction or other purposes.

Another object of the invention is to provide practical means for holding an array of business machine cards in a shingled arrangement, without shifting of the relative positions of the cards in the array, as the array is used.

Another object of the invention is to provide practical means for holding an array of cards on a plate, that will not prevent or interfere with reproduction of the array in standard document copying machinery.

A related object of the invention is to provide practical means for arranging and holding a stack of business machine cards in a shingled array, to permit the array to be reproduced efficiently with many different types of document copying machinery.

Another object of the invention is to provide a practical mechanical device for arranging a stack of business machine cards in a shingled array to display information that is recorded on the exposed marginal portions of the cards, that will arrange the cards initially so that the exposed portions are substantially uniform in size, and that will hold the array sufficiently firmly, while it is used, to maintain this uniformity.

Other objects of the invention will be apparent hereinafter from the specification and from the recital of the appended claims.

The present invention is a device that combines with an efficient mechanical card separating device that can distribute a stack of cards in a shingled array on a stepped shingling plate, simple means for gripping or clamping the cards in the array to hold them on the plate as arranged, during use of the array. The gripping means provided by the present invention does not interfere with the shingling operation and permits ready removal of the cards from the array after the array has been used.

In its preferred embodiment, the clamp provided by the present invention consists of a transversely arched plate, that is made of spring steel or other resilient material, and that has several uniformly spaced ears projecting from each of its longitudinal edges, in two columns. Blocks of resilient, yielding material are secured on these ears.

This clamp is formed so that it can be flattened readily under pressure, so that it can be placed beneath a stepped shingling plate, with one of its columns of yielding blocks disposed along and projecting above one edge of the shingling plate, and the other column of blocks disposed along and projecting above the opposite edge of the shingling plate. The blocks are disposed so that while the clamp is flattened beneath the shingling plate, there is sufficient clearance between the two columns of blocks to permit business cards to be arranged therebetween freely. The clamp is formed, however, so that upon release of the pressure that holds the clamp flat, it resumes its normal arched shape, and its center portion bows out away from the shingling plate, its longitudinal marginal portions embrace the edges of the shingling plate, and the blocks are tilted over the edges of the shingling plate, and onto its upper surface, to engage the margins of cards arranged thereon. This grips the cards sufficiently to clamp them in place on the shingling plate.

In the drawings:
FIGURE 1 is a perspective view of a shingling device that is constructed in accordance with one embodiment of this invention, showing a card separator at one position in its movement over a shingling plate in the process of shingling a stack of cards, and showing several shingled cards arrayed on the shingling plate, the direction of movement of the card separator being indicated by an arrow;

FIGURE 2 is a fragmentary sectional view on an enlarged scale, taken on the line 2—2 of FIGURE 1, looking in the direction of the arrows, partly exploded to show the follower above the well of the separator frame, better to illustrate the structure;

FIGURE 3 is a fragmentary sectional view taken on the line 3—3 of FIGURE 2, looking in the direction of the arrows;

FIGURE 4 is a fragmentary sectional view taken on the line 4—4 of FIGURE 3, looking in the direction of the arrows;

FIGURE 9 is a side view, on an enlarged scale, of the shingling plate, said view having been broken into halves in order to show the entire shingling plate in elevation;

FIGURE 10 is a fragmentary end elevation thereof, on an enlarged scale, and

FIGURE 11 is a fragmentary end elevation thereof, also on an enlarged scale, showing the end of the shingling plate opposite to that shown in FIGURE 10.

Figure 5:
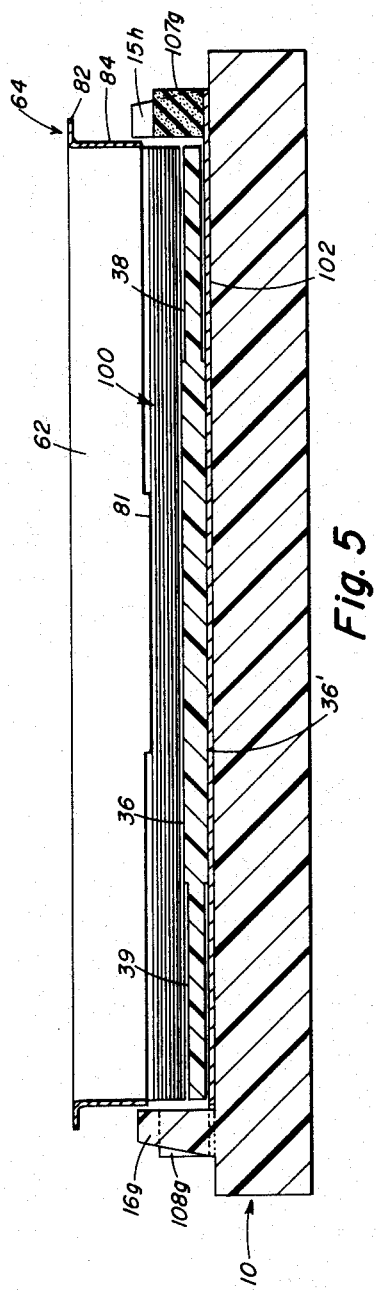
FIGURE 5 is a fragmentary sectional view taken on the line 5—5 of FIGURE 2, looking in the direction of the arrows.

Referring now in detail to the drawings by numerals of reference, 10 denotes a base in which a shingling plate 11 is mounted. A card separator 12 is mounted for sliding movement relative to the shingling plate 11 and the base 10, over the face of the shingling plate, to distribute cards in a shingled array on the shingling plate. Another major component of the shingling device of the present invention, which is the clamp for holding the shingled cards in place on the shingling plate after removal of the shingling plate from the base, is generally denoted by the numeral 14 (FIG. 7), and is partly concealed in the assembled device illustrated in FIGURE 1.

The structure of these several respective parts will now be described in sufficient detail to make their respective structures, purposes, and functions clear, and to permit thereafter a description of their cooperative action and use.

The base 10 is formed generally in the shape of a somewhat rectangular plate. It is formed along one marginal portion thereof with a column of aligned, upwardly projecting parts 15a, 15b, etc., through 15j. These projecting parts or guide rail segments are spaced uniformly from each other. The base 10 is also formed along its opposite marginal portion with similar aligned rail segments 16a, 16b, etc. through 16j.

A pair of lugs 17, 18 respectively are mounted adjacent the upper end of the base 10 (its right end as shown in FIG. 1), intermediate the ends of the columns of rail segments.

The base 10 is formed at its lower end (its left end as shown in FIG. 1) with a raised portion 21, to provide a shoulder 22 that extends transversely of the base. The columns of rail segments, hereafter designated collectively as the rails 15, 16, respectively, the lugs 17, 18, and the shoulder 22 are disposed and proportioned to receive an assembly consisting of the clamp 14 and the shingling plate 11 snugly therebetween, when the clamp 14 is flattened beneath the shingling plate.

The raised portion 21 of the base, at its lower end, is formed with a pair of recesses 24, 26, to provide access to the lower end of the shingling plate. A pair of lugs 27, 28 are mounted on the raised portion 21 of the base, adjacent and transversely intermediate the ends of the rails 15, 16 respectively.

The raised portion 21 of the base is also formed with a recess 31, within which one end of the spring clip 32 is secured. The spring clip 32 is formed and disposed to engage against the adjacent portion of the upper face of the shingling plate 11 under resilient spring pressure, to retain the shingling plate in place on the base. The spring 32 is formed with a projecting tab portion 34 by which the spring can be grasped to maneuver it.

In the preferred embodiment of the invention that is illustrated in the drawings, the shingling plate 11 is formed for use on both of its major faces. On the face that is uppermost in FIGS. 1 and 6, the shingling plate 11 is formed with a longitudinally-extending central portion or card support area 35, in which is formed a series of steps 36. The plate is also formed with a pair of longitudinally-extending coplanar flat surfaces 38, 39, at the sides respectively of the card support area 35. Each of the steps 36 consists of a flat inclined surface, 37, and an upright shoulder 41. The inclined surfaces 37, and the shoulders 41, are disposed in parallelism respectively. The inclined surfaces 37 extend upwardly from the plane of the flat adjacent surfaces 38, 39 of the shingling plate. Each shoulder 41 has an elevation that is preferably slightly less than (and in any event not greater than) the thickness of the business machine card with which it is to be used.

The inclined surfaces 37 are uniform in size, so that when business machine cards are disposed in a shingled array on the steps 36, with their ends abutted against the associated shoulders 41, the marginal portions of the cards, that are exposed, are of a uniform size.

At its upper end, the shingling plate 11 is formed with a transversely-extending flat surface 42, that is disposed at the same elevation as the highest parts of the inclined surfaces 37. Between the first shoulder 41a adjacent the upper end of shingling plate 11, the raised transverse surface 42, the card support area of the shingling plate is formed with an inclined surface 44 that increases in elevation from its lowermost end, at the shoulder 41a, to the level of the surface 42. The inclination of the surface 44 is such that the first and lowermost card, in a shingled array of cards, has its exposed portion disposed at substantially the same elevation as the exposed portions of the other cards in the array.

The shingling plate is also formed in its upper face, at its upper end, with a pair of recesses 46, 47, to provide access to the uppermost card in the shingling array, and to facilitate manipulation of the shingling plate, respectively.

At the lower end of its upper face, the plate 11 is formed with a flat surface 48 that has the same transverse extent as the steps 36, and that lies in a plane that contains the lines that represent the uppermost ends of the shoulders 41. The difference in elevation between the surface 48, and the lowermost part of the last inclined surface 37z, adjacent the lower end of the plate 11, corresponds to the height of the last shoulder 41z adjacent the lower end of the plate.

The shingling plate is formed in its longitudinally-extending sides with four vertically extending channels 51 (FIGS. 6 and 8 through 11), that extend through its thickness. These channels provide ways in which upstanding lips 51B formed along the edges of clamp 14 can engage, to assist in positioning clamps 14 with respect to the plate 11, so that the plate and clamp may be quickly and easily arranged on base 10 between side rails 15 and 16.

Figure 8:
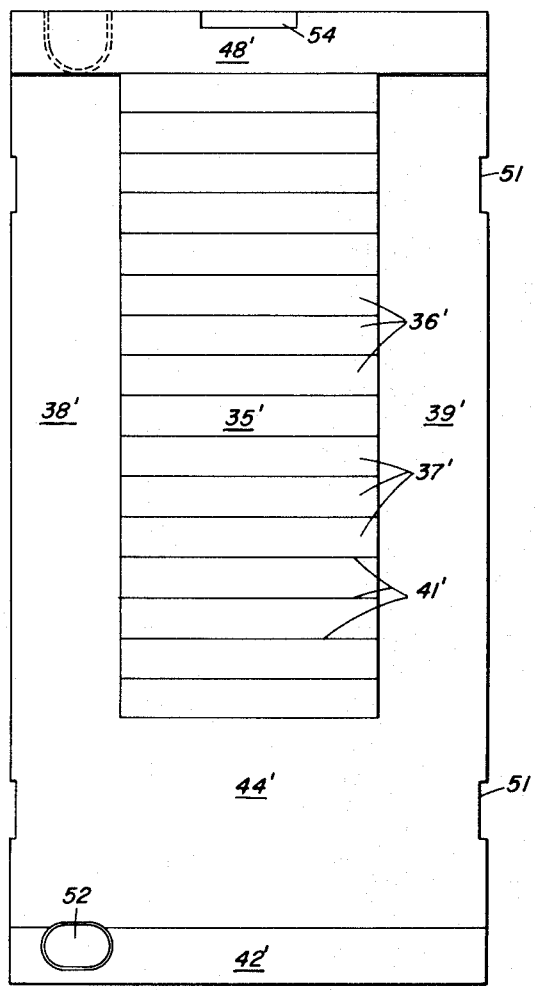
FIGURE 8 is a bottom plan view, on an enlarged scale, of the shingling plate.

The lower face of the plate 11 is formed in a somewhat similar fashion, as shown in FIGURE 8. However, the inclined surfaces 37′, of the steps 36′, have greater longitudinal extent than do the inclined surfaces 37 of the steps 36 on the upper face of the plate. For example, the inclined surfaces 37′ on the lower face of the plate may extend twice as far, longitudinally of the plate, as do the inclined surfaces 37 on the upper face of the plate, so as to expose marginal portions of shingled business machine cards that are twice as large as would be the case with cards shingled on the upper face of the plate.

The lower face of the plate 11 is also formed with a recess 52 (FIG. 8) that is formed partly in the elevated, transversely extending surface 42′, and partly in the flat, longitudinally extending marginal surface area 38′. The plate is formed in the other end of its lower face with a notch 54 that extends from the end of the plate, and across a central area thereof, into the flat elevated surface 48′, as best shown in FIGURES 8, 10 and 11.

The card separator 12 consists of an open frame for drawing a stack of cards over the shingling plate, and a follower for weighting the stack down. The frame of the separator comprises a leading member 61 (FIGS. 1, 2 and 3) and a trailing member 62, that are secured together by a pair of side bars 64, 66 (FIGS. 1, 2 and 5).

The leading member 61 is formed at its leading edge with a downwardly depending skirt 67. This skirt is formed with a centrally located recess 68, that is proportioned to permit the member 61 to move freely over the tab 34 of the spring 32 at the lower end of the base 10. The skirt 67 is also formed with a pair of downwardly depending legs 71, 72 respectively, that are disposed at opposite sides of the skirt. These legs are formed with bent-under extensions 73, 74 respectively, that are engaged for sliding movement against the flat surface areas 38, 39 of the shingling plate, respectively. These legs 71, 72, and the skirt 67, are proportioned so that the lower edge of the skirt 67 is always clear of the steps 36.

The member 61 is formed at its trailing end with another downwardly depending skirt 76, whose lower end is also clear of the steps. A knob 77 is secured adjacent the leading end of the member 61 by a fastener 78, to permit the separator to be grasped and moved.

The trailing member 62 of the separator frame has a generally rectangular cross section, but is formed at its leading lowermost edge with a rounded downward extension or bar 81, whose transverse extent corresponds to that of the steps 36 of the shingling plate. The bar 61 is disposed so that, when the device is in use, it occupies a position directly above the stepped portion of the shingling plate, as shown in FIGURE 5.

The side bars 64, 66, are angular in section. Thus, the side bar 64 has a horizontally extending web member 82 (FIG. 5) that is integral with a vertically extending web member 84. The other side bar 66 has corresponding web portions 82', 84' (FIG. 2) respectively. The horizontally extending web portions 82, 82', are disposed so that in the assembled device, as shown in FIG. 5 on an exaggerated scale, they are clear of the upper surfaces of the rails 15, 16 respectively. However, the horizontally extending web portions 84, 84' of the two side frame members are disposed to seat closely adjacent the inner surfaces of the rails 15, 16 respectively, for sliding engagement therewith to guide the movement of the card separator 12 during its operation.

The follower 86 is formed with a flat, transversely extending web portion 87 that is formed with a pair of transversely extending depressed ribs 91, 92. A tab 94 is struck upwardly from the web 87 to provide means for grasping the follower. It also provides a window 95 to expose to view a portion of a business card beneath the follower. The follower 86 is also formed, at its lateral sides, with upstanding arms 96, 97, that are disposed for sliding engagement with the internal surfaces of the web portions 84, 84' of the side bars 64, 66 respectively. The arms 96, 97 are formed respectively with integral, outwardly extending wings 98, 99.

The follower 86 is proportioned so that it can fit loosely within the well that is formed in the separator, so that it can be placed upon the uppermost card in a stack 100 (FIG. 2) of business machine cards.

Figure 7:
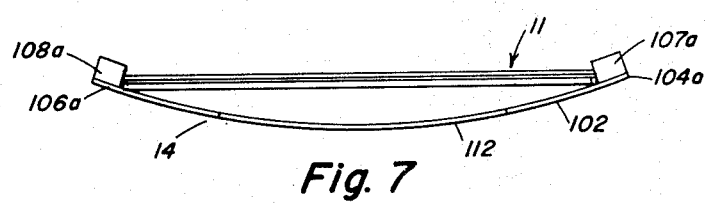
FIGURE 7 is an end view thereof, the arch of the clamp being slightly exaggerated, better to illustrate it.

The clamp or gripper 14 consists of a plate 102 of thin spring steel or other similar material, that is formed so that it normally has a curved transverse section, as shown in FIGURE 7. The plate 102 is formed along each of its longitudinally extending margins with a plurality of integral, rectangularly shaped projecting ears 104a, 104b, 104c, etc., and 106a, 106b, 106c, etc., respectively. The several ears 104a, 104b, 104c, etc., that project from one side of the plate 102, are uniformly spaced, and are hereafter referred to collectively as the ears 104. The ears 106a, 106b, 106c, etc., that project from the opposite side of the plate 102, correspond in position and relative spacing to the ears 104, and are hereafter referred to collectively as the ears 106.

Blocks of resilient foamed elastomeric material 107a, 107b, 107c, etc., and 108a, 108b, 108c, etc., are secured to the upper surfaces of the ears 104, 106 respectively, and are hereafter referred to collectively as the resilient blocks 107, 108 respectively.

As shown in FIGURE 7, the clamping member or gripper 14 is proportioned so that the edges of the shingling plate 11 are lightly embraced by the confronting sides of the blocks 107, 108, when the clamping member 14 is freely engaged on the shingling plate.

Figure 6:
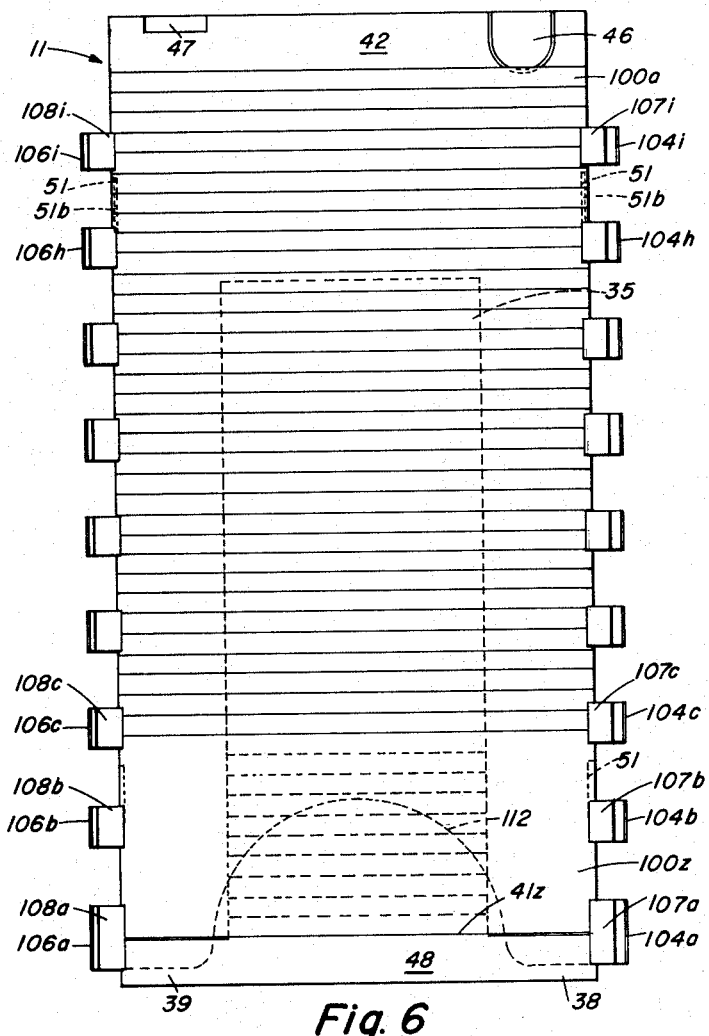
FIGURE 6 is a top plan view of the shingling plate, on an enlarged scale, showing it removed from the base and with a shingled array of business machine cards secured thereon by the clamp.

To facilitate handling of the assembly of the shingling plate 11 and clamp 14, as shown in FIGURES 6 and 7, the clamp is formed at its lower end with a large semicircular recess 112, so that the lower end of the shingling plate 11 can be grasped easily without also grasping, and applying pressure to, the plate 102 of the clamp.

A variety of materials may be employed in making the various parts of the device. The shingling plate preferably is made from a molded synthetic resinous material, since molding permits this part to be made economically. However, the shingling plate could also be made from metal by machining or casting and it could be made of other suitable material by techniques known in the fabricating arts.

The parts of the separator preferably are fabricated from sheet metal, or from preformed plastic structural shapes, but it too could be molded from synthetic resinous materials and the like. The base can be integrally molded from synthetic resinous material or can be formed by other common fabricating techniques and combinations of fabricating techniques.

The clamp 14 may be formed with a body or plate 102 from any satisfactory spring material, and the resilient blocks 106, 108 can be formed from substantially any resilient material. However, blocks formed from foamed elastomers, and specifically from foamed resilient polyurethane, are preferred.

To use the device of the present invention, to arrange and hold a stack of business machine cards in a shingled array for duplication by a document copier, the several parts of the device are first assembled in the following manner. The clamp 14 is flattened out by the application of pressure, and the shingling plate 11 is placed thereon, then the pressure is released so that the clamp 14 grips the plate as shown in FIGURE 7 with lips 51b engaged in channels 51.

The shingling plate is then checked to be sure that the steps on its free face are those of the size desired for the shingling operation that is to be performed. This assembly is then placed upon the base, by sliding the upper end of the shingling plate 11 beneath the lugs 17, 18 at the upper end of the base. The tab 34 of the spring 32 is then maneuvered to move the spring out of the way. The positions of the ears 104, 106 of the clamp are checked to see that they will fall between the rails 15, 16. The shingling plate is then pressed down onto the base, so that the plate portion 102 of the clamp is pressed and flattened between the lower face of the shingling plate and the base. The spring tab 34 is then released, to engage against the surface 48 of the shingling plate, to hold the assembly in place.

The separator 12 is then placed on the shingling plate, at its upper end. The follower 86 is removed, and a stack 100, of cards that are to be shingled, is placed in the well of the separator frame, so that the lowermost card rests directly on the shingling plate. The follower 86 is then replaced in the well, upon the stack of cards.

The knob 77 is then grasped and the separator is drawn from the upper end toward the lower end of the device. As the separator 12 is moved, the trailing edge of the stack of cards engages against the leading face of the member 62 of the separator, which then pushes the stack along over the face of the shingling plate. The lowermost card in the stack slides over the inclined surface 44 until the card butts up against the shoulder 41a. This stops further movement of the lowermost card, and as the movement of the separator is continued the stopped card is forced to slide under the round lower face of the bar 81, and thus leaves the stack of cards. The weight of the trailing member 62 of the separator presses the bar 81 down with a substantial amount of pressure to retain the cards in the stack except when the lowermost card is forced out by the action of the shingling plate.

As the movement of the separator continues, one card after another drops into the lowermost position in the stack, is brought into engagement with a shoulder, and is forced under the bar 81, out of the separator and out of the card stack, onto the surface of the shingling plate.

As the cards leave the stack, the follower 86 settles by gravity and continuously exerts pressure upon the stack of cards. The bar 81 also exerts pressure against the shingled cards to press them down against the surface of the shingling plate.

As the separator 12 is moved over the shingling plate, it slides on and is guided by its engagement against the rails 15, 16, so that the separator 12 and the cards in the stack 100 are held squarely during shingling. The confronting surfaces of the rails 15, 16, also serve, together with the shoulders 41, to support and hold the shingled cards in the desired shingled array during and after the shingling process.

As the separator 12 approaches the lower end of the shingling plate, the recess 68, in the front skirt 67 of the leading member 61 of the separator, permits the separator to be drawn over the upwardly projecting tab 34 of the spring 32, until the legs 71, 72, and the portions of the skirt adjacent these legs, engage against the stops 27, 28. At this point, a card should be engaged against each of the shoulders 41 of the steps. The lowermost card in the shingled array is supported on the inclined surface 44 of the shingling plate, and of the remaining cards, one card is supported on each of the inclined surfaces 37 of the steps 36. The uppermost card in the shingled array is butted up against the shoulder 41z. The separator 12 is then withdrawn from the base, and any cards remaining in the separator are removed.

The shingled array of cards, that is supported on the flat upper face of the shingling plate, can be reproduced photographically, xerographically, thermographically, or in any other convenient manner, to record the information that is displayed upon the exposed marginal portions of the shingled cards, in the following manner. The spring tab 34 is manipulated to move it out of the way, to permit the shingling plate to be removed from the base. The lower end of the shingling plate is then grapsed at the portions that are made accessible by the recesses 24, 26, and the lower end of the shingling plate is lifted upwardly. This relieves the pressure on the spring back 102 of the clamp, which arches back to its normal shape. As the clamp arches, the blocks 107, 108 are tilted over the upper face of the shingling plate and the arrayed cards, and grip the marginal edges of the cards in the array to clamp the cards in their shingled positions.

The clamped array of cards, as shown in FIG. 6, can then be transferred conveniently to a duplicating machine. If properly constructed, the gripping action of the clamp should be sufficient so that the assembly can be inverted without disturbing the relative positions of the cards on the shingling plate. The assembly can be inserted in any flat-bed exposure unit of a document copying machine, and duplicated.

Most of the conventional duplication techniques involve the application of pressure during exposure. When pressure is applied, the clamping member is flattened and the blocks are moved outwardly, so that any masking effect during exposure, by the gripping blocks, is minimized.

To use the opposite side of the shingling plate 11, to expose a larger marginal portion of each of the cards in the shingled array, the separator 12 is removed, then the spring tab 34 is manipulated to permit the shingling plate to be removed from the base and turned about its end 180°, so that the face of the shingling plate that contains the wider steps 36' is uppermost. The clamp 14 is transferred to the lower face of the shingling plate, after again aligning lips 51b in channels 51 and the assembly of the shingling plate and clamp is replaced in the base, and used as before.

In the preferred embodiment of the invention that is illustrated, both the shingling steps and the separator bar 81 have a substantially smaller transverse extent then the cards themselves; and the inclined surfaces of the steps are elevated above the plane of the flat surface areas 38, 39 of the shingling plate; and the follower 86 exerts pressure upon the cards. This arrangement permits the sides of the cards that extend outwardly over the flat surface areas 38, 39, to droop downwardly, and this promotes the shingling action by insuring that the lowermost card in the stack engages against the appropriate shoulder as the stack of cards is moved over the stepped shingling surface. This embodiment of the invention therefore is preferred to a shingling device including a plate that is formed with steps that extend across its entire width, since with this preferred construction, a card with a bent-up corner will not skim over the shoulders. Moreover, the tendency of the cards to droop at their lateral edges brings them into the optimum position for gripping by the blocks 107, 108.

Another important advantage of this shingling device is that its action is accurate, consistent, and uniform, and is substantially independent of operator technique. Moreover, the action of the device is relatively simple, and a minimum amount of training in its operation is required.

The preferred embodiment of the invention, that has been illustrated and described, fulfills the objectives of the invention advantageously. However, other structures, that embody the teachings hereof and the principles of the present invention, can be built, and provide satisfactory performance for many purposes.

For example, in the illustrated embodiment of this invention, the shingling plate, with the clamping member assembled, is retained in a base during shingling; the card separator is guided, in its movement during the shingling process, by rails that are formed in this base; and the gripping blocks of the clamp are arranged in uniformly spaced relation, to seat between uniformly spaced rail segments that collectively function as the rails on which the separator is guided. However, by way of example, to describe a somewhat different device that is constructed in accordance with the present invention, satisfactory shingling can be obtained in a device in which the base is dispensed with, and the shingling plate is formed with upwardly projecting rail segments along its opposite lateral margins. The clamp with such a modified shingling plate, can be fastened substantially as described herein, with its gripper blocks disposed to seat between the spaced rail segments on the shingling plate. The operation of such an assembly is substantially the same as the device described and illustrated herein, except that the pressure applied to the card separator during shingling is relied upon to flatten the clamp, to move the gripper blocks out of the way during shingling. Other modifications of the structure described will readily occur to those skilled in the art from the teachings herein.

While the clamp of this invention is intended primarily for use with shingled cards that are arrayed on a shingling plate, it can be used for holding cards, sheets, and other substantially flat members in a variety of arrangements, in place on a supporting plate.

In the illustrated, preferred embodiment of the invention, when the leading edge of the lowermost card in the stack engages against the shoulder of a step of the shingling plate, the trailing edge of that card is subjected to a continued forward pressure that is applied to it by the separator bar 81, that tends to urge the card to continue its forward movement. Some of the factors that govern the forces that act on the card at that point include the compressive force that is exerted on the lowermost cards by the follower and superjacent cards in the stack, the shape of the bar 81 and the smoothness of its surface finish, and forces, such as the weight of the frame member 62, that resist upward displacement of the bar 81 and the structure of which it is a part. These factors are balanced in making a separator in accordance with the preferred embodiment of this invention, so that a smooth separating action is obtained. Good separating action can be obtained, however, by other structures performing substantially these same card separator functions, such as, for example, a separator that utilizes a downwardly depending, resilient, flexible member, instead of a solid separator bar, or even a separator that relies upon some manual manipulation, to effect separation.

The gripper blocks can be secured on their respective ears in any convenient manner. The use of an adhesive layer is preferred for simplicity and economy.

While the invention has been described in connection with a specific embodiment thereof, it will be understood that the invention is capable of further modification, and this application is intended to cover any variations, uses, or adaptions of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having now particularly described my invention what I desire to secure by Letters Patent and what I claim is:

1. A clamp for gripping sheet material comprising a generally rectangular transversely bowed plate formed of resilient material and having a plurality of spaced ears which extend outwardly respectively from the opposed longitudinal edges thereof, the ears along one longitudinal edge of the plate being aligned with ears along the other longitudinal edge of the plate, and a plurality of blocks of yieldable, resilient material secured respectively to said ears on the concave side of said plate.

2. A clamp for gripping sheet material comprising a generally rectangular transversely bowed plate formed of resilient material and having a plurality of spaced ears which extend outwardly respectively from the opposed longitudinal edges of the plate, the ears along one longitudinal edge being transversely aligned with the ears along the other of said longitudinal edges respectively, to form spaced pairs of ears and a plurality of substantially uniformly sized blocks of yieldable, resilient elastomeric material respectively secured to said ears on the concave side of said plate.

3. A clamp in accordance with claim 2 wherein said plate is formed from spring steel.

4. A clamp in accordance with claim 2 wherein said blocks are formed from an expanded elastomeric material.

5. A clamp in accordance with claim 2 wherein said blocks are formed from a flexible foamed polyurethane.

6. A clamp in accordance with claim 2 wherein said plate is formed at one of its transverse ends with a longitudinally extending, centrally disposed recess.

7. A clamp for securing a generally thin flat display article on the surface of a plate having a predetermined thickness and a transverse width which is substantially equal to the width of said article, said clamp comprising a transversely bowed plate formed of resilient material, and pieces of yieldable, resilient material secured respectively along opposed longitudinal portions of said bowed plate on the concave side thereof, the distance between the pieces secured along one of said longitudinal portions and the pieces secured along the other of said portions being slightly less than said transverse width and the thickness of said pieces being greater than the combined thickness of the display article and first-mentioned plate, whereby upon embracing with the clamp the first mentioned plate and the display article, portions of said pieces overlap and thus secure the display article on said surface.

8. A clamp in accordance with claim 7 wherein said bowed plate has a recess extending longitudinally of the bowed plate from one end thereof to facilitate handling of said first mentioned plate when the display article is secured thereon.

9. A clamp in accordance with claim 7 wherein said bowed plate has a plurality of ears spaced along said opposed longitudinal portions, and wherein said pieces of resilient material comprise discrete blocks that are respectively mounted on said ears.

10. An assembly comprising a rigid, generally rectangular plate having a stepped surface area for supporting a plurality of business machine cards thereon in a shingled array, and having a transverse width which is substantially equal to the individual length of said cards, and a clamp for removably securing a shingled array of said cards on said plate, said clamp comprising a transversely bowed generally rectangular second plate formed of resilient material, and pieces of yieldable, resilient elastomeric material secured respectively along opposed longitudinal marginal portions of said second plate on the concave surface thereof, said clamp resiliently embracing said first mentioned plate with said pieces of elastomeric material disposed in overlapping relation to the transverse marginal portions of the cards in said shingled array to thus secure said shingled array on said first mentioned plate.

11. An assembly comprising a base having a channel for receiving a plate; a plate removably mounted in said channel with one surface of said plate exposed, said plate being adapted to support a generally flat display article having one dimension which is substantially the same as the transverse width of said plate; a clamp for securing said display article on said plate when removed from said base, said clamp being sandwiched in said channel between said base and said plate and comprising a transversely bowed plate formed of resilient material which is substantially flattened between said base and said first mentioned plate when in said channel, pieces of yieldable resilient material having a thickness which is greater than the thickness of said first mentioned plate and secured respectively on opposed longitudinal marginal portions of the concave side of said bowed plate, the distance between the pieces on one longitudinal portion of said bowed plate and the pieces on the other longitudinal portion thereof being slightly greater than said transverse width when the bowed plate is sandwiched in the channel and being slightly less than said transverse width when said bowed plate is released from its flattened condition in said channel; and means for releasably securing said first mentioned plate on said base with said bowed plate sandwiched in substantially flattened condition therebetween whereby the pieces of said clamp are disengaged from the first mentioned plate when so secured on said base to allow the display article to be positioned on the first mentioned plate and the pieces embrace the first mentioned plate and overlap the display article to secure the same thereon when the first mentioned plate is released from the base.

12. An assembly in accordance with claim 11 and wherein said display article is a shingled array of business machine cards and said exposed surface of said first mentioned plate comprises a series of substantially uniformly sized stepped surfaces which lie in spaced parallel planes for supporting thereon respectively portions of said cards, said stepped surfaces being separated by generally upright shoulders each having an elevation which is not greater than the thickness of one of said cards and wherein said assembly further comprises card separator means for engaging a stack of said cards and mounted for movement over said exposed surface of said first mentioned plate in a direction to engage the then lowermost card in said stack against a shoulder of the said first mentioned plate to thus form said shingled array, means for urging said lowermost card toward said exposed surface during movement of said separator means thereon and means engageable with said separator for guiding the same during such movement thereof.

13. An assembly in accordance with claim 12 and wherein said guide means comprises a pair of columns of aligned, spaced rail segments formed to project upwardly from opposed longitudinal edges respectively of said channel in said base, whereby the rail segments in each column function collectively as a guide rail; and wherein said bowed plate has a plurality of spaced ears which extend outwardly respectively from the opposed longitudinal edges thereof, and said pieces of resilient material are discrete blocks that are secured on said ears respectively, said ears being arranged to seat between the rail segments on said base.

14. Means for arranging, supporting, and holding cards in a shingled array, comprising a base for receiving a shingling plate, a rigid shingling plate removably mounted on the base, card separator means mounted for movement over the shingling plate to arrange a stack of cards in a shingled array thereon, said separator means and said base including means for guiding the movement of said separator over the shingling plate, clamp means sandwiched between said shingling plate and said base, and means for detachably mounting said shingling plate over said clamp means on said base, said clamp means cooperating with said plate to engage and secure in place cards arrayed on the shingling plate when said shingling plate is released from said base by said mounting means.

References Cited in the file of this patent

UNITED STATES PATENTS

| | | |
|---|---|---|
| 773,358 | Weed | Oct. 25, 1904 |
| 808,936 | Lintz | Jan. 2, 1906 |